United States Patent [19]

Lipp et al.

[11] Patent Number: 4,888,106

[45] Date of Patent: Dec. 19, 1989

[54] METHOD OF USING POLYMERIC SULFIDE MINERAL DEPRESSANTS

[75] Inventors: David W. Lipp; D. R. Nagaraj, both of Stamford, Conn.

[73] Assignee: American Cyanamid Company, Stamford, Conn.

[21] Appl. No.: 363,235

[22] Filed: Jun. 8, 1989

Related U.S. Application Data

[62] Division of Ser. No. 182,681, Apr. 18, 1988.

[51] Int. Cl.$^4$ ............................ B03D 1/02; B03D 1/06
[52] U.S. Cl. ........................................ 209/167; 252/61
[58] Field of Search ................... 209/166, 167; 252/61

[56] References Cited

U.S. PATENT DOCUMENTS

| | | | |
|---|---|---|---|
| 3,671,492 | 6/1972 | Nakaguchi | 526/288 |
| 3,700,648 | 10/1972 | Hirooka | 526/288 |
| 4,139,455 | 2/1979 | Griffith | 209/167 |
| 4,256,227 | 3/1981 | Petrovich | 209/166 |
| 4,289,613 | 9/1981 | Goodman | 209/167 |
| 4,360,425 | 11/1982 | Lim | 209/167 |
| 4,720,339 | 1/1988 | Nagaraj | 209/167 |
| 4,744,893 | 5/1988 | Rothenberg | 209/167 |

*Primary Examiner*—David L. Lacey
*Assistant Examiner*—Thomas M. Lithgow
*Attorney, Agent, or Firm*—Frank M. Van Riet

[57] ABSTRACT

Various acrylamide/allyl thiourea polymers and their use as depressants in the beneficiation of sulfide minerals from ores are disclosed.

5 Claims, No Drawings

METHOD OF USING POLYMERIC SULFIDE MINERAL DEPRESSANTS

This is a divisional of copending application Ser. No. 182,681, filed on Apr. 18, 1988.

BACKGROUND OF THE INVENTION

The present invention relates to froth flotation processes for recovery of mineral values from base metal sulfide ores. More particularly, it relates to new and improved sulfide mineral depressants for use in separating or beneficiating sulfide minerals by froth flotation procedures, and to a new and improved process for beneficiating sulfide minerals by froth flotation incorporating said depressants.

Certain theory and practice state that the success of the sulfide flotation process depends to a great degree on reagents called collectors that impart selective hydrophobicity to the mineral value which has to be separated from other minerals.

Certain other important reagents, such as the modifiers, are also largely responsible for the success of flotation separation of the sulfide and other minerals. Modifiers include all reagents whose principle function is neither collection nor frothing, but one of modifying the surface of the mineral so that a collector either adsorbs to it or does not. Modifying agents may thus be considered as depressants, activators, pH regulators, dispersants, deactivators, etc. Often, a modifier may perform several functions simultaneously. Current theory and practice of sulfide flotation again state that the effectiveness of all classes of flotation agents depends to a large extent on the degree of alkalinity or acidity of the ore pulp. As a result, modifiers that regulate the pH are of great importance. The most commonly used pH regulators are lime, soda ash and, to a lesser extent, caustic soda. In sulfide flotation, however, lime is by far the most extensively used. In copper sulfide flotation, which dominates the sulfide flotation industry, for example, lime is used to maintain pH values over 10.5. The costs associated with adding lime are becoming quite high and plant operators are interested in flotation processes which require little or no lime addition, e.g., flotation processes which are effectively conducted at slightly alkaline, neutral or even at acid pH values. Neutral and acid circuit flotation processes are particularly desired because pulp slurries may be easily acidified by the addition of sulfuric acid, and sulfuric acid is obtained in many plants as a by-product of the smelters. Therefore, flotation processes which do not require preadjustment of pH to neutral or acid pH values using less expensive sulfuric acid are preferable to current flotation processes, which presently require pH readjustment to highly alkaline values of at least about 11.0 using lime which is more costly.

As has been mentioned above, lime consumption in individual plants may vary anywhere from about one pound of lime per metric ton of ore processed up to as high as 20 pounds of lime per metric ton of ore. In certain geographical locations, such as South America, lime is a scarce commodity, and the current costs of transporting and/or importing lime has risen considerably in recent years. Still another problem with prior art high alkaline processes is that the addition of large quantities of lime to achieve sufficiently high pH causes scale formation on plant and flotation equipment, thereby necessitating frequent and costly plant shutdowns for cleaning.

It is apparent, therefore, that there is a strong desire to reduce or eliminate the need for adding lime to sulfide flotation processes to thereby provide substantial savings in reagents costs. In addition, reducing or eliminating lime in sulfide ore processes will provide other advantages by facilitating the operation and practice of unit operations other than flotation, such as fluids handling or solids handling, as well as the improved recovery of secondary minerals.

In general, xanthates and dithiophosphates are employed as sulfide collectors in the froth flotation of base metal sulfide ores. A major problem with these sulfide collectors is that at pH's below 11.0, poor rejection of pyrite or pyrrhotite is obtained. More particularly, in accordance with present sulfide flotation theory, the increased flotation of pyrite at a pH of less than 11 is attributed to the ease of oxidation of thio collectors to form corresponding dithiolates, which are believed to be responsible for pyrite flotation.

In addition to attempts at making the sulfide collectors more selective for value sulfide minerals, other approaches to the problem of improving the flotation separation of value sulfides have included the use of modifiers, more particularly depressants, to depress the non-value sulfide minerals and gangue minerals so that they do not float in the presence of collectors, thereby reducing the levels of non-value sulfide contaminants reporting to the concentrates. As has been mentioned above, a depressant is a modifier reagent which selectively prevents or inhibits adsorption of the collectors on certain of the mineral particles surfaces present in the flotation slurry or pulp. Prior art sulfide depressants have been generally selected from highly toxic and difficult to handle inorganic compounds such as sodium cyanide, (NaCN), sodium hydro sulfide, (NaSH), and Nokes reagent ($P_2S_5$ and NaOH). These conventional sulfide depressants represent a number of serious problems and have serious shortcomings attendant with their use. The oft used depressants are frequently extremely toxic and may be associated with a terrible stench. They cannot be used safely over a wide range of pH values, but instead must be used at high pH values, so that lime consumption problems are not solved by their use. Moreover, the conventional inorganic depressants are often either nonselective or when used in sufficient quantities to provide good separation, provide economically unsatisfactory concentrates, i.e., the yield of value minerals is too low.

The problem facing flotation beneficiation methods today is to provide value mineral concentrations which contain substantially reduced levels of gangue sulfide minerals. The flotation concentrates are generally delivered to the smelting operations without any further substantial processing. Large amounts of sulfur dioxide are emitted from the smelters during the smelting of sulfide concentrates; a significant amount of $SO_2$ is from the gangue sulfide minerals such as iron sulfides, which invariably report to the smelters as contaminants in the flotation concentrates. $SO_2$ pollution of the atmosphere has always been a serious problem because it is a major cause for acid rain, which has a devastating effect on the ecology. Despite significant advances in smelting technology, $SO_2$ pollution remains extremely serious.

Complex sulfide ores are an important source of many base metals and precious metals. It is quite common to find 3–5 metals in each deposit, in addition to Au, Ag and impurity elements such as Sb, As, Bi and Hg. The treatment method depends on the relative proportions of the different metals, but the more widely used routes are: (a) bulk flotation of sulfides followed by separation of value sulfides, and (b) differential flotation of sulfides. It is necessary to characterize each complex sulfide deposit quantitatively and systematically and then to select the economically optimum combination of process steps to suit the characteristics. Depressants are invariably used in all stages of flotation. Lime, sodium or zinc cyanide, zinc sulfate (often in combination with sodium cyanide), $SO_2$, dichromate, dextrine, hypochlorite, and ferro cyanide are some of the most commonly used depressants.

The beneficiation criteria for treating the complex sulfide ores are maximum value metal and precious metals (if any) recovery and minimum contamination of the value sulfide concentrate by non-value sulfide minerals. In many cases, these criteria cannot be met without seriously sacrificing value metals production or recovery. Therefore, there remains an urgent need for flotation reagents that can selectively depress gangue sulfide minerals reporting to the concentrate and concurrently provide economically acceptable recoveries of value sulfide minerals.

Unexpectedly, in view of the foregoing, it has now been discovered that certain synthetic polymers which contain certain functional groups are very effective depressants for all sulfide numerals in general, and, more particularly, for pyrite, pyrrhotite, and other gangue sulfide minerals. The use of the depressants of the present invention provides a substantial reduction in gangue sulfide minerals contamination in the sulfide minerals concentrates reporting to the smelters, thereby reducing the adverse environmental impact of $SO_2$ emissions caused by smelting operations in the industry. It has also been discovered that the instant polymers unexpectedly depress one or more value sulfide minerals in the presence of other value sulfides or non-sulfides under appropriate dosage and/or other operating conditions.

BACKGROUND OF THE INVENTION

The copolymerization of allyl thioureas with acrylamides has not been disclosed in the prior art. Allyl thioureas have, however, been copolymerized with other materials such as sulfur dioxide (U.S. Pat. No. 3386972) and vinyl chloride (U.S. Pat. No. 3012010). These copolymerizations are not suggestive, however, of the copolymers of the present invention.

Additionally, U.S. Pat. Nos. 2832755; 2837499 and 2858295 disclose the copolymerization of vinyl(thioureas with unsaturated comonomers while U.S. Pat. No. 3671492 teaches the copolymerization of thioureas such as N-vinylethylene thiourea with unsaturated monomers. None of this references however, teach the production of polymers falling within the structure set forth hereinbelow and all of the above-cited references fail to teach the use of allyl thiourea copolymers as a depressant in the recovery of mineral values from ores.

DESCRIPTION OF THE INVENTION

In accordance with the present invention, new and improved sulfide mineral depressants are provided in the form of polymeric compositions, said compositions comprising a polymer comprising: (i) x units of the formula:

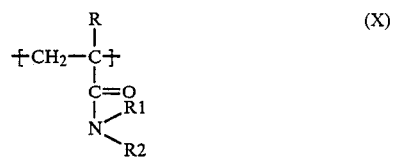

(ii) y units of the formula:

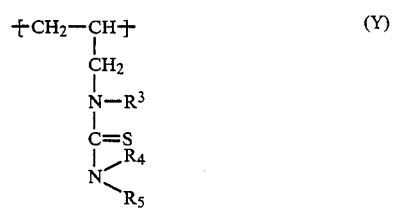

(iii) z units of the formula:

wherein R is hydrogen or $C_1$-$C_4$ alkyl; each $R^1$ and $R^2$, individually, is hydrogen or a $C_1$-$C_4$ alkyl group; each $R^3$, is hydrogen, a $C_1$-$C_4$ alkyl group or an aryl group, and each $R^4$ and $R^5$ is individually, hydrogen, a $C_1$-$C_4$ lower hydrocarbon group or on any dry group, Z represents the polymerization residue of any monomer copolymerizable with units X and Y, x represents a residual mole percent fraction; y is a mole percent fraction ranging from about 1.0% to about 50%, preferably 5-30%, z is a mole percent fraction ranging from about 0% to about 50%; preferably 0-30%, and the molecular weight of the polymer ranges from about 1,000 to about 1,000,000.

In preferred embodiments, the polymeric compositions comprise polymers within the scope of the above definition which comprise as the Y units, monomeric units wherein $R^3$, $R^4$ and $R^5$ are hydrogen.

The new and improved compositions of the present invention may be prepared by known polymerization methods whereby the acrylamide component X is copolymerized with the thiourea component Y and, optionally, with comonomer unit Z. Examples of suitable polymerization procedures are set forth in U.S. Pat. Nos. 3002960 and 3255142, hereby incorporated herein by reference.

More particularly, the polymers of this invention comprise as the (X) units, those derived from acrylamide per se, alkyl acrylamides such as methacrylamide, etc and N-substituted acrylamide and methacrylamides such as N,N'-dimethylacrylamide, etc.

The (Z) units of the polymers defined above generally comprise monomers such as acrylonitrile, styrene, cationics such as diallyl dimethyl ammonium chloride, methacrylamidopropyl trimethylammonium chloride, acrylamidopropyl trimethylammonium chloride, dimethylaminopropyl methacrylamide, dimethylaminoethyl acrylate or methacrylate, their quaternary salts, acrylic, methacrylic or maleic acids, their alkali metal e.g., sodium or potassium, or ammonium salts, and alkyl esters thereof and the like.

The (Y) units of the polymer defined above are derived from thiourea derivatives such as allyl thiourea, N-allyl-N'-methyl thiourea, N-allyl-N'-benzoyl thiourea, N-allyl-N-methyl-N',N'-dimethyl thiourea and the like. These novel compositions may be used in flotation processes for important separations; for example, copper sulfides from molybdenite by depressing the former; lead and copper sulfides from pyrite and sphalerite by depressing the latter; pentlandite from pyrrhotite by depressing the latter; copper sulfides or sphalerite from pyrite by depressing the latter, etc.

In another aspect, the present invention provides a new and improved method for the beneficiation of value sulfide minerals from sulfide ores with selective rejection of gangue sulfide minerals, said method comprising:

(a) providing an aqueous pulp slurry of finely divided, liberation-sized ore particles:

(b) conditioning said pulp slurry with an effective amount of a synthetic depressant, a sulfide mineral collector and a frothing agent, said synthetic depressant comprising a polymer comprising: (i) x units of the formula:

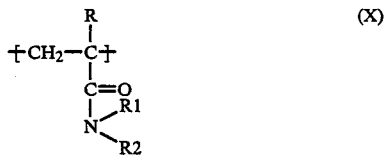

(ii) y units of the formula:

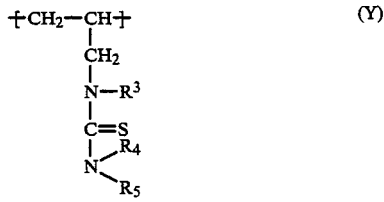

(iii) z units of the formula:

wherein R is hydrogen or $C_1$–$C_4$ lower alkyl; each $R^1$ and $R^2$ is, individually, hydrogen or $C_1$–$C_4$ lower alkyl; $R^3$ is hydrogen, a $C_1$–$C_4$ alkyl group or an aryl group and each $R^4$ and $R^5$ is, individually, hydrogen, a $C_1$–$C_4$ hydrocarbon group or an aryl group; Z represents the polymerization residue of any monomer copolymerizable with units X and Y, x represents a residual mole percent fraction; y is a mole percent fraction ranging from 1.0 to about 50%; preferably 5–30%; z is a mole percent fraction ranging from about 0% to about 50%; preferably 0–30% and the molecular weight of said polymer ranges from about 1000 to about 1,000,000; and, (c) collecting the value sulfide mineral by froth flotation procedures.

The new and improved method for beneficiating value sulfide minerals by froth flotation procedures employing the synthetic depressants in accordance with this invention provides excellent metallurgical recovery with significant improvements in grade. The novel sulfide mineral depressants are effective over a wide range of pH and dosages. The depressants are compatible with available frothers and sulfide mineral collectors and may be readily incorporated into any currently operating system or facility. Moreover, use of the polymeric sulfide mineral depressants can significantly reduce $SO_2$ emissions from smelting operations by reducing the amount of gangue sulfide minerals which remain in the value sulfide concentrate to be smelted.

The present invention is directed to the selective separation of sulfides, for example, gangue sulfides, from copper ores, copper-molybdenum ores, complex sulfide ores, etc. containing lead, copper, zinc, silver, gold, etc., nickel and nickel-cobalt ores, gold ores and gold-silver ores and to facilitate copper-lead, lead, lead-zinc, copper-zinc separations, etc. The following examples are set forth for purposes of illustration only and are not to be construed as limitations on the present invention, except as set forth in the appended claims. All parts and percentages are by weight unless otherwise specified.

EXAMPLE 1

Acrylamide (9.0 parts) and N-allylthiourea (1.0 part) are dissolved in water (90 parts) and added to a suitable vessel equipped with a nitrogen gas inlet tube and an agitator. The solution is stirred, agitated for 30 minutes and heated to 50° C. Polymerization initiator ammonium persulfate (0.05 part) is dissolved in water (5.0 parts) and the solution sparged with nitrogen for 10 minutes. The initiator solution is added and after 3 hours the reaction is complete. The copolymer is recovered and analyzed. The intrinsic viscosity is found to be 0.48 which corresponds to a molecular weight of about 50,000. The $^{13}C$ N.M.R., IR and elemental analysis of the copolymer show about 6 mole percent incorporation of the allyl thiourea therein.

EXAMPLE 2

The procedure of Example 1 is again followed except that 2,2'-azobis(2,4-dimethylvaleronitrile) (ABDV) catalyst is used instead of ammonium pensulfate. A copolymer with an intrinsic viscosity of 1.67, which corresponds to a molecular weight of about 300,000, is obtained. Analysis of this copolymer shows that the copolymer contains about 6 mole percent allyl thiourea.

EXAMPLE 3

To a suitable three-necked flask, equipped with a mechanical stirrer and a condenser, are added 7.5 parts of allyl thiourea (0.0645 mole) and 287 parts of water with stirring. The pH of the solution is adjusted to 4.4 with dilute sulfuric acid. The contents of the flask are gently heated to 60° C. while sparging with nitrogen. About 3 parts of a catalyst system similar to that used in Example 1 and 82.4 parts of 50% acrylamide (0.58 mole) are then charged, gradually over a period of 2–3 hours. Polymerization is complete in approximately 4–6 hours. The finished copolymer has an intrinsic viscosity of about 0.15 DL/g and an average molecular weight of about 6000.

EXAMPLE 4

Acrylamide (9.0 parts) and N-allylthiourea (1.0 part) are dissolved in ethyl acetate (85 parts). This solution is added to a suitable reaction vessel equipped with a nitrogen gas inlet tube and an agitator. The solution is agitated for 30 minutes and heated to 50° C. Polymerization initiator, 2,2'-azobis (2,4dimethylvaleronitrile), (0.05 part) is dissolved in ethyl acetate (5 parts) and the solution is sparged with nitrogen for 10 minutes. The initiator solution is added and after 3 hours the reaction is complete. To the polymerization vessel is added ethyl acetate (100 parts). The resultant slurry of copolymer is agitated for 10 minutes and the insoluble copolymer is isolated by filtering the slurry through a fritted funnel. The copolymer collected on the funnel is washed with ethyl acetate (200 parts) and vacuum dried to remove unreacted monomers. The intrinsic viscosity of this copolymer is 0.92, indicating a molecular weight of about 135,000.

EXAMPLES 5-18

The procedures of Examples 1 and 2 are again followed, i.e., either ammonium persulfate (APS) or ABDV is used to initiate the polymerizations. The compositions prepared are shown in Table I, below. Mercaptoethanol is used as a chain transfer agent.

EXAMPLES 32-35

In these examples, pure pyrite and chalcopyrite charges are used. Flotation tests are carried out in a 250 ml glass cell with a coarse fritted bottom. The as-received large crystals of pyrite and chalcopyrite are crushed and screened to obtain = 8+35 mesh size fraction. This fraction is stored at all times in a freezer at $-18°$ C. Just before a flotation test, a small sample of pyrite (or chalcopyrite) is ground in an agate mortar with an agate pestle and screened to obtain approxi-

TABLE I

| | (Weight %) | | | | Mercaptoethanol | |
|---|---|---|---|---|---|---|
| Example | X units $R_1, R_2$ | Y units $R_3 = H$ $R_4, R_5 =$ | Z units | Catalyst | PPM on total monomers (wt) | Molecular Weight |
| 5 | H,H(90) | H,H(10) | — | ABDV | 3,000 | 200,000 |
| 6 | H,H(90) | H,H(10) | — | ABDV | 6,000 | 132,000 |
| 7 | H,H(90) | H,CH$_3$(d10) | — | ABDV | 12,000 | 78,000 |
| 8 | H,H(90) | H,—CH$_2$CH$_2$OH(10) | —APS | — | 62,000 | |
| 9 | H,H(80) | H,H—CH$_2$CH$_2$OH(10) | AA$^1$(10) | ABDV | — | 235,000 |
| 10 | H,H(80) | H,H(10) | AA (10) | ABDV | — | 185,000 |
| 11 | AA$^1$(10) | H,H(10) | DADMAC$^2$(10) | ABDV | — | 52,000 |
| 12 | AA$^1$(10) | H,H(10) | MAPTAC$^3$(10) | ABDV | — | 160,000 |
| 13 | AA$^1$(10) | H,H(10) | APTAC$^4$(10) | ABDV | 3,000 | 84,000 |
| 14 | CH$_3$,CH$_3$(90) | H,H(10) | — | ABDV | 3,000 | 225,000 |
| 15 | CH$^3$,CH$_3$(70) | H,H(20) | DMAEMMC$^5$(10) | ABDV | 3,000 | 260,000 |
| 16 | H,H(90) | H,H(10) | — | ABDV | 24,000 | 30,000 |
| 17 | H,H(90) | H,H(10) | — | APS | 24,000 | 15,000 |
| 18 | H,H(70) | H,H(10) | AA(20) | APS | 24,000 | 15,000 |

$^1$Acrylic Acid = (AA)
$^2$Diallyldimethyl ammonium chloride (DADMAC)
$^3$Methacrylamidopropyltrimethyl ammonium chloride (MAPTAC)
$^4$Acrylamidopropyltrimethylammonium chloride (APTAC)
$^5$Dimethylaminoethylmethacrylate/methyl chloride quaternary. (DMAEMMC)

EXAMPLES 19-31

The procedure of Example 4 is again followed, i.e., the specified catalyst is used to initiate copolymerizations of acrylamides, allyl thioureas, and optionally a third monomer. All monomers are completely dissolved in ethyl acetate prior to initiation of polymerization. By varying the amount of catalyst and controlling the polymerization temperature, desired molecular weights are obtained as determined by intrinsic viscosities. Analysis of these copolymers show good incorporation of the allylthioureas and, optionally, the third monomer. The compositions prepared are shown in Table II, below.

mately 1 g. of $-100+200$ mesh fraction. This fraction is mixed with 9 g. of clean $-48+65$ or $-65+100$ mesh quartz and the mixture is suspended in 240 ml distilled water containing $2\times10^{-3}$M KNO$_3$ (to maintain ionic strength) and conditioned as follows: (a) 1 min. for pH adjustment to 8.5 with KOH and HNO$_3$, (b) 2 min. with 5 ml of $5\times10^{-3}$M sodium isopropyl xanthate (this was sufficient to give almost complete flotation of pyrite), c) 2 min. with 2 or 10 ppm depressant and 2.5 ml of 3000 ppm methylisobutyl carbinol (MIBC) frother solution (30 ppm final concentration). Flotation is then carried out by passing nitrogen until no more solids are floating. The concentrates and tails are filtered separately, dried and weighed.

TABLE II

| Example | X units $R_1, R_2$ | Y units $R_3 = H$ $R_4, R_5$ | Z units | Molecular Weight |
|---|---|---|---|---|
| 19 | H,H(95) | H,H(5) | — | 180,000 |
| 20 | H,H(80) | H,H(20) | — | 74,000 |
| 21 | H,H(90) | H,H(5) | AA$^1$(5) | 210,000 |
| 22 | H,H(85) | H,H(5) | AA(10) | 205,000 |
| 23 | H,H(75) | H,H(5) | AA(20) | 205,000 |
| 24 | H,H(85) | H,H(10) | AA(5) | 100,000 |
| 25 | H,H(90) | H,CH$_3$(10) | — | 120,000 |
| 26 | H,H(90) | H,2-hydroxy ethyl(10) | — | 175,000 |
| 27 | H,H(90) | H,n-Butyl(10) | — | 183,000 |
| 28 | H,H(90) | H,n-phenyl(10) | — | 63,000 |
| 29 | H,H(90) | H,CH$_3$CH$_2$OC(=O)—(10) | — | 27,000 |
| 30 | H,H(90) | H,tert Butyl(10) | — | 50,000 |
| 31 | CH$_3$,CH$_3$(90) | H,H(10) | — | 215,000 |

The test results are given in Table III. It is evident that the polymers effectively depress pyrite and chalcopyrite.

TABLE III

| Example | Depressant | Dosage ppm | Wt % Floated Individual Pyrite | Chalcopyrite |
|---|---|---|---|---|
| A | None | — | 95.0 | 97.0 |
| B1 | NaCN | 2.0 | 32.0 | 58.0 |
| B2 | NaCN | 10.0 | 2.0 | 3.0 |
| C | NaHS | 10.0 | 85.0 | 41.0 |
| 32 | Copolymer of Example 1 | 2.0 | 2.5 | 3.0 |
| 33 | Copolymer of Acrylamide and diallyl thiourea | 2.0 (90/10) | 5.0 | 1.0 |
| 34 | Copolymer of Example 7 | 2.0 (90/10) | 15.0 | 1.0 |
| 35 | Copolymer of Example 26 | 2.0 (90/10) | 2.0 | 0.5 |

EXAMPLES 36–38

In these examples, a Cu-Mo bulk concentrate containing 30.5% Cu and 0.72% Mo is used. The objective is to depress Cu and float Mo. The Standard depressants used for this purpose are NaHS at 5-6 lb/t and NaCN at 0.42 lb/t. The results of the evaluation of the novel polymers of this invention are compared against the standard depressants in Table IV.

With the standard depressants (5.3 lb/t NaHS and 0.42 lb/t NaCN), the copper recovery is 5.5% and molybdenum recovery is 93.8%. At a very high dosage of the novel polymer of Example 3 (viz. 2.72 lb/t) both Cu and Mo are severely depressed (Example 36) thereby indicating no selectivity and that lower dosages will have to be used. At the lower dosage of only 0.91 lb/t, the Cu recovery is 20% and Mo recovery is 77.8% (Example 37), thus indicating vastly improved selectivity. The best result, however, is obtained when the polymer is used at 0.8 lb/t in conjunction with 1.1 lb/t of NaHS (Example 38); Cu recovery is only 5.7% which compares very well with the 5.5% recovery obtained at high dosages of the standard depressants and the Mo recovery is 87.2% which is also quite satisfactory. It must be noted that no NaCN is used in this example.

TABLE IV

| Example Number | Depressant | Cu Dosage lb/t % | Cu grade % Cu | Mo rec. % | Mo grade % Mo |
|---|---|---|---|---|---|
| D | Std. NaHS plus NaCN | 5.3 0.42 | 5.5 | 25.0 | 93.8 | 9.9 |
| 36 | Polymer of Example 3 | 2.72 | 3.5 | 31.2 | 8.3 | 1.79 |
| 37 | " | 0.9 | 20.0 | 21.8 | 77.8 | 3.22 |
| 38 | " plus NaHS | 0.8 1.1 | 5.7 | 26.3 | 87.2 | 9.1 |

It must also be noted that the dosages of the novel polymer and NaHS in Example 38 are unoptimized. Those skilled in the art will be able to readily obtain the best performance at very low dosages of the novel polymer by simply optimizing the dosages of the polymer and NaHS. Although it is not our objective to be bound by any one mechanism for the efficacy of the combination of the novel polymer and NaHS in Cu-Mo separation, one could speculate that the role of the small amount of NaHS used in Example 38 is one of activating/cleaning the Cu sulfide mineral surfaces, so that the novel polymer can adsorb on these selectively rather than on $MoS_2$ surfaces. Stated differently, the novel polymer adsorbs effectively and selectively on Cu sulfides under appropriate redox potentials. NaHS, being a strong reducing and potential determining agent for sulfides, is providing such appropriate redox conditions at controlled dosages. One can also speculate that if the conditions are too reducing (i.e., very high dosages of NaHS), the adsorption of the novel polymer would be destabilized in a manner similar to the destabilization of the xanthate collectors. Under these conditions, as also in the absence of NaHS, the polymer would be adsorbed non-selectively on $MoS_2$ surfaces, though this adsorption is weak and physical in nature.

It must be noted that any other chemical with strongly reducing or oxidizing (in certain minerals systems) properties can be used in conjunction with the novel polymer to obtain appropriate redox conditions. In other words, any "surface-modifying" agent can be used to prepare the sulfide surfaces to enhance adsorption of the novel polymers. Examples of such reagents include NaCN, Nokes reagent, mercaptoethanol, thioglycolic acid, Na or K ferri and ferro cyanides, hydroxyethyltrithiocarbonates, and other trithiocarbonates, hydrogen peroxide, ozone, air, oxygen, sulfur dioxide, zinc cyanide, arsenic Nokes, mercaptopropionic acid, mercaptosuccinic acid, other related mercapto acids, 2-thiouracil, thioglycerol and the like. Additional compounds that can be used in conjunction with the novel polymer are given in the publication Nagaraj et al., Trans. IMM, Vol. 95, Mar. 1986, pp. C17. Ratios of these surface modifying agents to the novel polymer hereof range from about 0.05–5.0:1, respectively, preferably about 0.02–2.0:1, although conditions of use and ores treated may vary these amounts somewhat.

A further point to note is that a conditioning time of 20 min. is usually required for standard depressants, whereas with the novel polymer hereof, conditioning times of less than 10 minutes are often quite adequate. This time differential has a significant practical implication in terms of higher throughput and operational cost savings.

EXAMPLE 39

In this example, a different Cu-Mo concentrate is used. The feed contains 28.0% Cu and 3.15% Mo. The Cu sulfide mineral is predominantly chalcopyrite which exhibits a high sensitivity to air oxidation followed by very high floatability. Depression of chalcopyrite with NaHS is therefore only temporary and lasts for about 2 min. after air is turned on during flotation. As a result, both Cu and Mo recoveries are less consistent than those obtained with the previous Cu-Mo sample above.

The results are given in Table V. With the standard NaHS depressant, a dosage of 3.7 to 6.87 lb/t gives Cu recoveries in the range of 6.7 to 15.8% and Mo recoveries in the range of 78.8 to 95.4% (Examples E-G). When the novel polymer of the present invention is used at 0.80 lb/t in conjunction with about 1.3 lbs/t of NaHS, the Cu recovery obtained is 8.4% and the Mo recovery is 82.6% (Example 39) which are both acceptable and comparable to those obtained with the standard NaHS depressant. It is observed during the flotation tests that a conditioning time of 15 min. is required for NaHS whereas a conditioning time of only 5 minutes is adequate with the polymer. Also depression with the polymer is longer lasting than with NaHS.

TABLE V

| Example Number | Depressant | Dosage lb/t | Cu rec % | Cu grade % Cu | Mo rec. % | Mo grade % Mo |
| --- | --- | --- | --- | --- | --- | --- |
| E | Std. NaHS | 3.7 | 14.3 | 22.0 | 89.0 | 15.3 |
| F | Std. NaHS | 5.4 | 6.7 | 17.7 | 78.8 | 24.3 |
| G | Std. NaHS | 6.87 | 15.8 | 22.0 | 95.4 | 14.2 |
| 39 | Polymer of Ex 3 plus NaHS } | 0.80 1.3 | 8.4 | 18.7 | 82.6 | 21.1 |

EXAMPLES 40–45

In these examples, a Cu-graphite bulk concentrate containing 2–10% Cu in the form of copper sulfide minerals and 5–40% carbon is used. The objective is to depress the copper minerals and float graphite; further the amount of copper in the graphite concentrate should be as low as possible. The depressant of the present invention is used to depress the copper minerals. NaHS is used in some tests as a surface conditioning agent for copper sulfides. In one test, HETC, another reducing agent, is used as a surface conditioning agent along with the polymer of Example 33. The results are set forth in Table VI, below.

TABLE VI

| Example # | Depressant | Dosage g/t | Cu-Conc. Cu Rec % | Cu-Conc. Grade % Cu | Graphite Conc. % Cu |
| --- | --- | --- | --- | --- | --- |
| | | Feed Cu 10.3% | | | |
| H | None | | 2.1 | 2.24 | 11.25 |
| 40 | Polymer of Ex. 3 | 500 | 80.5 | 14.41 | 4.72 |
| 41 | Polymer of Ex. 3 + NaHS | 500 + 500 | 70.1 | 20.9 | 4.64 |
| 42 | Polymer of Ex. 3 | 750 | 89.6 | 12.81 | 3.69 |
| 43 | Polymer of Ex. 3 + NaHS | 750 + 200 | 95.6 | 12.61 | 2.08 |
| | | Feed Cu 2.2% | | | |
| I | None | | 9.7 | 1.451 | 2.269 |
| 44 | Polymer of Ex. 3 | 500 | 94.8 | 2.732 | 0.47 |
| | | Feed Cu 4.0% | | | |
| J | HETC* | 1233 | 91.4 | 5.64 | 0.943 |
| 45 | Polymer of Example 3 + HETC* | 73 + 400 | 94.8 | 4.96 | 0.914 |

*2-hydroxyethyl trithiocarbonate

These results demonstrate clearly the improvement in Cu-Graphite separation obtained with the use of the polymers of the present invention; they also demonstrate the improvement in the sharpness of separation when a surface conditioning agent is used in conjunction with the polymers of the present invention.

Example 46

In this example, a Ni-Cu flotation feed to the scavenger circuit is used. This feed is collected in an operating plant and transferred to a central location for flotation testing. The feed consists of the magnetic fraction of the ore and the scavenger concentrate from the non-magnetic fraction. The objectives here are to maximize rejection (depression) of pyrrhotite gangue sulfide contained in the feed, increase the grade of nickel concentrate, and obtain reasonably high Cu and Ni recoveries.

The pulp from the plant is already ground and conditioned with a xanthate collector and a frother. The pulp is conditioned with the depressant for 2 min. at a pH of 9.5–10.5 and floated in a Denver flotation cell at 1400 rpm with an air flow rate in the range of 3–5 l/min. Timed flotation concentrates are taken and assayed for Cu, Ni and S. The results in Table VI provide an excellent demonstration of the efficacy of the polymers of the present invention as selective depressants. At 50 g/t, the polymer gives a 56% reduction in pyrrhotite with 14 units loss in Ni recovery and 7 units loss in Cu recovery. The loss in Ni recovery in this circuit is to be expected since a significant amount of Ni is actually in solid solution with pyrrhotite, and this bound nickel will be depressed if pyrrhotite is depressed. An appropriate indicator of selectivity between free nickel and pyrrhotite is the index I in Table VI. The index I is 1.1 in the absence of any depressant. Upon addition of the depressant, the ratio remains unaltered thereby indicating that with respect to pyrrhotite in the tails, no additional free nickel is lost. In other words, the polymer indeed provides selective depression of pyrrhotite.

TABLE VI

| | | | Cu—Ni—Pyrrhotite Feed Scavenger Circuit: 0.46% Cu, 1% Ni, 21.8% S, 52% Pyrrhotite (Po) | | | | | | |
| --- | --- | --- | --- | --- | --- | --- | --- | --- | --- |
| | | | Cu | | Ni | | Po | | |
| Ex. | Depressant | g/t | Rec | Grade | Rec | Grade | Rec | Grade | I* |
| K | None | | 89.0 | 1.7 | 63.0 | 2.5 | 36.0 | 76.0 | 1.1 |
| 46 | Polymer of Example 1 | 50 | 82.0 | 2.7 | 49.0 | 3.5 | 16.0 | 64.0 | 1.1 |

*$I = \dfrac{\text{Ni assay in tail}}{\text{Po assay in tail}} \times 100$;

Any depressant used should preferably maintain an I value equal to or lower than that in the control test, i.e., Example K.

EXAMPLE 47

The procedure as set forth in Example 46 is followed in this example except that a new feed which is much higher in Po is used and a different batch of the depressant polymer is used. The results given in Table VII demonstrate that the polymer provides a selective depression of pyrrhotite (the recovery decreases from 50.5% in the absence of depressant to 33% at 56 g/t of depressant; a reduction of 35%). The copper loss is only 2.8 units and the Ni loss is about 11 units. The I value is even slightly lower than that in the control test indicating that the depressant is indeed selective.

TABLE VII

| | Scavenger Circuit: 0.40% Cu, 1% Ni, 60% Po, | | | | | | | |
|---|---|---|---|---|---|---|---|---|
| | | | Cu | | Ni | | Po | |
| Ex. | Depressant | g/t | Rec | Grade | Rec | Grade | Rec | Grade | I |
| L | None | | 83.9 | 0.74 | 71.8 | 1.67 | 50.5 | 80.0 | 1.04 |
| 47 | Polymer of Ex-2 | 56 | 81.1 | 1.38 | 60.4 | 2.44 | 33.0 | 77.0 | 1.03 |

EXAMPLE 48

The effect of aging and aeration of the pulp on the depressant activity of the polymers of the present invention is tested using essentially the procedure set forth in Example 46, except that the pulp is agitated (open to atmosphere) in a flotation cell for 30 minutes (including 2 minutes aeration in between) prior to addition of the polymer. The results given in Table VII demonstrate that the depressant activity is maintained or even increased for the aged and aerated pulp, and that the polymer is able to depress even aged and oxidized Po quite effectively.

TABLE VIII

| | | | Cu | | Ni | | Po | | |
|---|---|---|---|---|---|---|---|---|---|
| Ex. | Depressant | g/t | Rec | Grade | Rec | Grade | Rec | Grade | I |
| M | None | | 86.5 | 1.15 | 68.2 | 2.05 | 44.8 | 78.0 | 0.99 |
| N | None | | 85.6 | 1.25 | 65.0 | 2.07 | 41.0 | 77.8 | 1.00 |
| 48 | Polymer of Ex-1 | 78.0 | 81.8 | 2.25 | 52.5 | 3.11 | 19.7 | 67.3 | 1.03 |

EXAMPLE 49

The procedure as described in Example 46 is followed, but the feed containing 1.5% Cu, 2.4% Ni and 35% Po is from a different mill. The pyrrhotite in this feed floats quite excessively and it is very difficult to depress. The objectives here are once again to reject as much Po as possible in the process of recovering Ni. Also a larger fraction of the Po contains the valuable Ni in intimate association or solid solution. Consequently, with the depression of Po, some Ni losses are inevitable. The results are set forth in Table IX.

TABLE IX

| | | | Cu | | Ni | | Po | |
|---|---|---|---|---|---|---|---|---|
| Ex. | Depressant | g/t | Rec | Grade | Rec | Grade | Rec | Grade |
| 0 | None | | 91.6 | 3.25 | 87.2 | 4.98 | 75.8 | 64.8 |
| 49 | Polymer of Ex-2 | 190 | 70.0 | 5.65 | 64.7 | 8.43 | 21.9 | 44.1 |

These results demonstrate that even on this difficult feed, the use of the novel polymer of the present invention at 190 g/t results in 71% reduction in Po reporting to the concentrate, the grade of the Ni concentrate increases from 5% to 8.4% Ni and the associated loss in Ni is about 25%, which is to be expected considering the intimate association of some Ni with Po. Furthermore, by carefully adjusting the dosage of the polymer and by stage addition, the loss of Ni can be minimized.

EXAMPLE 50

Following the procedure as described in Example 46, the effectiveness of the novel depressants of this invention are evaluated on a feed from yet another mill. This feed contains 0.64% Cu, 1.9% Ni, and 47% Po, has a siqnificant proportion of magnetic Po which floats quite readily and is hard to depress. The results are given in Table X.

TABLE X

| | | | Cu | | Ni | | Po | |
|---|---|---|---|---|---|---|---|---|
| Ex. | Depressant | g/t | Rec | Grade | Rec | Grade | Rec | Grade |
| P | None | — | 79.0 | 0.84 | 87.5 | 2.86 | 92.5 | 73.1 |
| 50 | Polymer of Ex-2 | 290 | 62.5 | 1.04 | 69.1 | 3.44 | 50.9 | 63.7 |

These results demonstrate clearly that the novel polymer is able to depress Po quite effectively. A reduction in Po flotation of 55% is realized with the use of about 290 g/t of the polymer. The loss in Ni recovery is about 18% units or about 21% of the total Ni. This loss can once again be attributed to Ni associated with Po either as a fine dissemination in Po or as a solid solution. The grade of Po in the Ni concentrate is reduced from 73.1 (in the absence of depressant) to 63.7% Po in presence of depressant. This is a significant reduction in Po reporting to the Ni and Cu smelters and results in the reduction of $SO_2$ emissions.

EXAMPLE 51

In this example, a massive complex sulfide ore containing Zn, Cu and Fe sulfides is ground to about 45%−200m, conditioned with $H_2SO_4$ and ethyl xanthate and a frother, floated at acid pH (4-7) to obtain a bulk sulfide concentrate which is cleaned, reground with lime (85%-200M) and conditioned with sodium silicate and sodium cyanide at pH 10.5-10.8. Thus conditioned pulp is floated to recover as much copper selectively as possible, rejecting both iron and zinc sulfides. It can be readily seen that the polymer of the present invention provides satisfactory performance at reduced lime dosage which is desirable in this plant. It gives better iron and zinc rejection, although at a higher dosage. The results are set forth in Table XI, below.

TABLE XI

Cu—Pyrrhotite - Zn ore
Feed: Cu 0.5-0.7%; Zn—0.9%; Fe—33%; S—18%

| Example | Depressant | g/t | Lime kg/t | Cu Rec. | Fe Rec. | Zn Rec. |
|---|---|---|---|---|---|---|
| Q | Std. Cyanide | 54 | 5.2 | 78.0 | 14.6 | 23.0 |
| R | Std. Cyanide | 40 | 6.3 | 95.8 | 20.7 | 38.0 |
| 51 | polymer of Ex.-1 | 107 | 1.34 | 85.0 | 18.5 | 30.8 |

EXAMPLE 52

In this example, another complex sulfide ore is used. The pulp, containing approximately 1800 parts of dry solids, is collected directly from the plant zinc circuit and is conditioned for 1 min. with lime to give a pH of 11.0 followed by conditioning for 2 min. with the depressant. The pulp is then conditioned with copper sulfate to activate sphalerite, sodium isobutyl xanthate collector and a polypropylene glycol frother. Thus conditioned pulp is floated in several stages to collect timed concentrates. The results are given in Table XII, below.

The objective here is to reduce the amount of Pb and Cu reporting to the zinc concentrate and to produce a high grade zinc concentrate. It is evident from the results that the use of the polymer of the present invention increased the grade of zinc in the concentrate from 31.5% Zn to 36.3% while decreasing Cu and Pb recoveries.

EXAMPLE 52

A complex Pb-Zn-Fe-ore is used for these examples. 500 Parts of the as-received −10 mesh ore are ground in a ball mill for 20 min. at 60% solids with lime to provide the desired pH. The ground pulp is conditioned for 2 min. with sodium isobutyl xanthate, a commercially available dithiophosphate collector and the depressant employed. Rougher and scavenger flotation is then carried out for 2 and 4 minutes respectively, and the products are assayed for Pb, Zn and Fe.

The objective here is to recover as much Pb as possible with rejection of Zn and especially Fe (as iron sulfides).

The results are set forth in Table XIII.

TABLE XIII

| Example No. | Depressant | Dosage g/t | Rougher Pb | Rougher Zn | Rougher Fe | Scavenger Pb | Scavenger Zn | Scavenger Fe | Overall Pb | Overall Zn | Overall Fe |
|---|---|---|---|---|---|---|---|---|---|---|---|
| T | Lime<br>Zinc Sulfate | (pH 8.0)<br>1714<br>750 | 70.9 | 11.8 | 27.6 | 16.6 | 18.2 | 45.3 | 87.5 | 30.0 | 72.9 |
| 52 | Polymer of Example 26 | 400<br>(pH 8.0) | 62.3 | 8.1 | 9.6 | 20.9 | 19.2 | 29.8 | 83.2 | 27.3 | d39.4 |
| 53 | Polymer of Example 26 | 200+<br>200 | 69.5 | 19.5 | 21.2 | 13.8 | 12.2 | 12.7 | 83.3 | 31.7 | 33.9 |
| 54 | Polymer of Example 7 | 400 | 67.1 | 11.5 | 10.5 | 11.9 | 9.0 | 8.6 | 79.0 | 21.0 | 19.1 |
| 55 | Polymer of Example 1 (50K M.W.) | 200 (to scav.) | 52.0 | 8.4 | 5.3 | 15.0 | 8.0 | 7.9 | 67.0 | 16.4 | 13.2 |
| 56 | Polymer of Example 2 (300K M.W.) | 200 (to scav.) | 56.3 | 9.0 | 6.2 | 10.7 | 8.5 | 7.9 | 67.0 | 17.5 | 14.1 |
| 57 | Polymer of Example 24 | 200 (to scav.) | 51.3 | 8.1 | 5.4 | 15.2 | 8.9 | 9.5 | 66.5 | 17.0 | 14.9 |

AA = acrylic acid; AMD = acrylamide

These results demonstrate clearly the excellent selectivity of the novel polymers of the present invention against iron sulfides gangue. When using zinc sulfate, in conjunction with lime, as the depressant at 750 g/t, iron recovery (in the form of iron sulfides gangue) is about 73% which is too high for the lead smelter. With the use of the acryl-amide-allyl droxy ethyl thiourea copolymer at only 400 g/t, the iron recovery is reduced from 73% to 39% (Example 52); zinc recovery is slightly lower (27% vs 30%) and lead loss is merely 4 units which can be either tolerated or recovered in another flotation operation using selective reactivation with a xanthat or dithiophosphate collector. When the depressant in Example 52 is split equally between rougher and scavenger 200+200 g/t (Example 53) there is further reduction in iron recovery from 39% to 34%. With the use of an acrylmide-allyl methyl thiourea copolymer, the iron recovery is only 19% compared with the 73% obtained with zinc sulfate (see Example 54.)

In the case of the acrylamide-allyl thiourea copolymer, 400 g/t is too high. The dosage is, therefore, reduced to 200 g/t (Example 55). With the polymer of

TABLE XII

Cu—Zn—Pb—Ag—Pyrite Ore
Feed: Zinc Circuit, 6.8% Zn, 0.1% Cu, 0.28% Pb,
CuSO4 750 g/t

| Example | Depressant | g/t | Zn Rec | Zn Grade | Cu Rec | Cu Grade | Pb Rec | Pb Grade |
|---|---|---|---|---|---|---|---|---|
| S | None | — | 92.5 | 31.5 | 36.9 | 0.17 | 40.1 | 0.57 |
| 52 | Polymer of Ex-1 | 56.0 | 87.3 | 36.3 | 27.7 | 0.17 | 30.1 | 0.51 |

M.W. 50,000, at 200 g/t, the iron recovery is only 13% (vs. 73% for zinc sulfate). The lead recovery is low (67%), but this can be improved by further decreasing the depressant dosage or by selective reactivation - flotation. The zinc recovery is also substantially reduced (16% vs. 30% for zinc sulfate) which is an added benefit.

Substantially the same results are obtained with a polymer of MW 300,000 instead of 50,000 (compare Example 55 and 56), thereby indicating that MW does not have an effect on the depressant activity at the levels tested.

Example 57 demonstrates that the polymer's depressant activity is maintained even upon introduction of acrylic acid units in the polymer. The acrylic acid group's carboxyl functionality provides additional hydrophilic character to the polymer without affecting the depressant activity which is attributable to the thiourea functionality.

Replacement of the thiourea copolymers of the previous examples with any of those copolymers prepared in Examples 1–31 results in equivalent depressant activity.

We claim:

1. A method for the beneficiation of value sulfide minerals, from a sulfide ore containing said value sulfide minerals and a second sulfide mineral with selective separation of value sulfide minerals from said second mineral which comprises:
   (a) providing an aqueous pulp slurry of finely-divided, liberated ore particles;
   (b) conditioning said pulp slurry with an amount of a synthetic depressant effective to depress said second mineral, a value sulfide minerals collector and a frothing agent, respectively, said depressant comprising a polymer comprising:
   (i) x units of the formula:

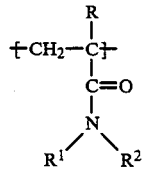

(ii) y units of the formula:

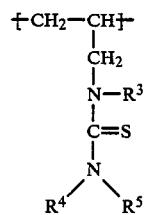

(iii) z units of the formula:

wherein each of R, $R^1$ and $R^2$ is, individually, hydrogen or a $C_1$-$C_4$ alkyl group, $R^3$ is hydrogen, a $C_1$-$C_4$ alkyl group or aryl, $R^4$ and $R^5$ are, individually, hydrogen a $C_1$-$C_4$ hydrocarbon group or an aryl group and Z represents the polymerization residue of a mononer selected from the group consisting of acrylonitrile, styrene, a cationic, or acrylic, metacrylic or maleic acid or alkali metal salts or alkyl estes of said acids; X represents a residual mole percent fraction; y is a mole percent fraction ranging from about 1.0% to about 50.0%, by weight, based on the total weight of x, y, and z; z is a mole percent fraction ranging from about 0% to about 50.0%, by weight, same basis, and the molecular weight of said polymer is between about 1000 and about 1,000,000; and 2. A method according to claim 1 wherein each of R, $R^1$, $R^2$, $R^3$, $R^4$ and $R^5$ is hydrogen.

3. A method according to claim 1 wherein at least one of R, $R^1$, $R^2$, $R^3$, $R^4$ and $R^5$ is a $C_1$-$C_4$ alkyl groups.

4. A method according to claim 1 wherein the depressant contains or is used in combination with, a surface-modifying agent.

5. A method according to claim 4 wherein said surface-modifying agent is NaHS, NaCN, Nokes reagent, mercapto ethanol, thioglycolic acid, sodium and potassium ferrocyanides and ferricyanides, hydroxyethyltrithiocarbonates, carboxyethyl trithiocarbonates, sodium trithiocarbonates, hydrogen peroxide, ozone, air oxygen, sulfur dioxide, zinc cyanide, calcium cyanide, arsenic Nokes, mercapto propionic acid, mercapto succinic acid, 2-thiouracil or thioglycerol.

* * * * *